United States Patent [19]
Bonge, Jr.

[11] Patent Number: 5,872,516
[45] Date of Patent: Feb. 16, 1999

[54] ULTRASONIC TRANSCEIVER AND REMOTE CONTROLLED DEVICES FOR PETS

[76] Inventor: Nicholas J. Bonge, Jr., 1670 Brodiea Ave., Ventura, Calif. 93001

[21] Appl. No.: 199,614

[22] Filed: Feb. 22, 1994

[51] Int. Cl.$^6$ .................................................. G08B 23/00
[52] U.S. Cl. .......................... 340/573; 340/541; 340/552; 367/6; 367/93; 119/719; 119/720
[58] Field of Search ..................... 340/573, 571, 340/541, 552; 367/93, 6; 119/719, 720

[56] References Cited

U.S. PATENT DOCUMENTS

| | | | |
|---|---|---|---|
| 3,897,753 | 8/1975 | McDade et al. | 119/51.02 |
| 3,980,051 | 9/1976 | Fury | 367/6 |
| 4,686,504 | 8/1987 | German | 340/573 |
| 4,733,633 | 3/1988 | Yarnall, Sr. et al. | 340/573 |
| 4,898,120 | 2/1990 | Brose | 340/573 |
| 5,121,711 | 6/1992 | Aine | 340/573 |
| 5,170,149 | 12/1992 | Yarnall, Sr. et al. | 340/573 |
| 5,177,900 | 1/1993 | Solowiej | 49/363 |
| 5,207,178 | 5/1993 | McDade | 340/573 |
| 5,207,179 | 5/1993 | Arthur et al. | 340/573 |
| 5,241,923 | 9/1993 | Janning | 340/573 |

*Primary Examiner*—Jeffery Hofsass
*Assistant Examiner*—Benjamin C. Lee

[57] ABSTRACT

An ultrasonic transceiver device and remote output devices controlled by the transceiver for use by domestic pets. The transceiver utilizes a fixed interval edge detect modulation system to lock out stray environmental noise thereby, avoiding false triggering and greatly increasing the working range. Output devices include: a wireless pet containment system in which ultrasonic transmitters are mounted on a series of posts defining the perimeter of the containment area and a receiver device adapted to be worn by a domestic animal. Upon receiving the transmitted ultrasound the receiver device sounds a warning tone followed by an electric shock to train the animal to stay within the perimeter; a sonic alarm system to deter a domestic animal from entering a restricted area whereby, an ultrasonic transmitter is worn by the animal and a receiver with an alarm output is placed in a stationary location to sound an alarm chasing the animal from the area in which the receiver is placed; a remote pet training device whereby a hand held transmitter is carried by a human trainer and a receiver unit is worn by the pet, the receiver produces a set of training tones in response to the modulated ultrasound produced by the transmitter; and a remotely operated pet door which automatically opens under its own power when it receives a signal from an ultrasonic transmitter worn by a pet.

20 Claims, 12 Drawing Sheets

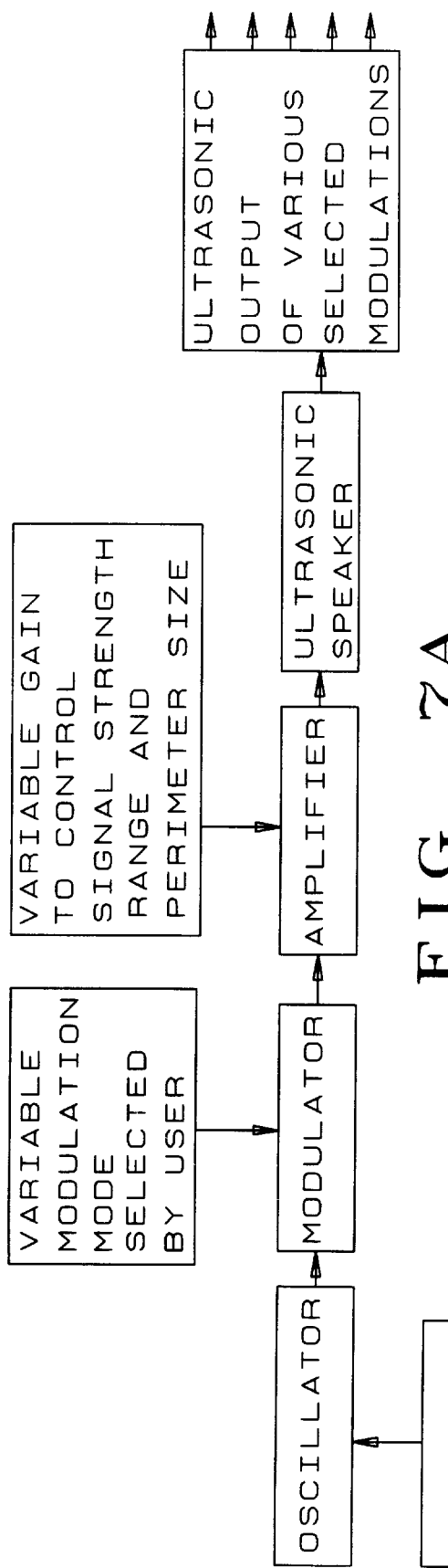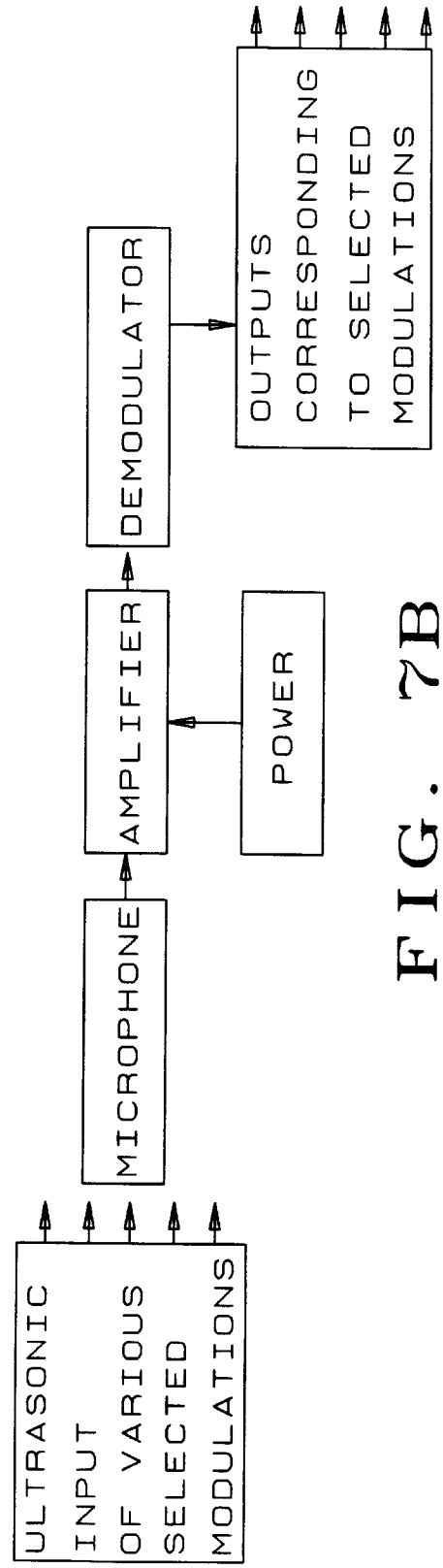

ULTRASONIC TRANSCEIVER AND REMOTE CONTROLLED DEVICES FOR PETS

FIELD OF THE INVENTION

The field of the invention pertains to an ultrasonic transceiver to control output devices for use by and for pets and more particularly to a transceiver with modulation characteristics to improve range and avoid false triggering in the control of a wireless pet containment system; a sonic alarm for area restriction; a remote pet trainer and a remotely operated, fully automatic pet door.

BACKGROUND OF THE INVENTION

This invention has the purpose of facilitating a means by which pets can self activate automatic devices and allow humans to operate the devices remotely. The scope of this invention includes a modulated ultrasonic transceiver utilizing a fixed duration edge detect means to extend the range of the device by distinguishing between a low level transmitted signal and environmental noise. This is employed to control a wireless pet containment system; a sonic alarm for area restriction; a remote pet trainer and a remotely operated, fully automatic pet door but, its uses can easily be extended to other output devices.

PRIOR ART

Conventional devices utilizing ultrasound for remote sensing, such as ultrasonic burglar alarms, have been severely limited by the directionality, acoustical shadowing and limited range inherently characteristic of ultrasonic devices. For that reason they have been largely replaced by radio frequency and infrared transceivers.

In the pet field, electronic containment systems and remote trainers use radio frequency based transmitters and receivers. These devices are expensive to produce and severely restricted by the fact that they create interference to other radio frequency transmissions. To avoid this problem, manufactures must use extremely low power devices, practical for only very short range operation, or subject the design to restrictions placed upon it by regulating agencies such as the Federal Communications Commission. The use of ultrasound has been largely ignored as an alternative for the reasons listed above.

Electronic pet containment systems typically employ a radio frequency transmitter and an antenna in the form of a buried cable to enclose the perimeter of the containment area. As the pet wearing an R.F. receiver approaches the buried cable, a warning tone is sounded. Then, if the animal has not retreated from the perimeter after a predetermined time, an electric shock is delivered. Such systems present certain difficulties such as having to burry the cable.

Remote trainers typically use a hand held radio frequency transmitter to activate a single output (usually an electric shock or an irritating sound pulse) at the receiver worn by the pet. The single output of conventional systems is always used as a negative reinforcing stimulus rather than a positive enforcement of a specific behavior.

Conventional systems using sound to chase intruding animals from a restricted area use either infrared detection to sense the presence of the intruder (in much the same manner as a burglar alarm) or radio frequency. In addition to the fact that both such systems are relatively expensive to manufacture, the infrared system has the disadvantage that it will trigger on any warm body including humans and is therefore not selective. A system of this type may work well in keeping the family dog off the couch but, it would also drive the people of the household away form the couch as well. The radio frequency systems are selective but, to date are limited to a range of less than four feet to avoid expense and unwanted R.F. interference.

It would therefore be desirable to create a remote transceiver system for pets to facilitate containment, training and area restriction which has relatively long range capability, which does not interfere with radio frequency devices nor is subject to the governmental restrictions of radio frequency devices, which is selective to an individual transmitted signal and which is relatively inexpensive to mass produce. The invention described herein provides such a system.

The current state of the art with respect to electronic pet doors is limited to devices which are operated by a magnet or a very low power R.F. transmitter worn on a pet's collar. The limited range of these transmitters restricts the design to smaller units suitable only for cats or small dogs. The transmitterused in this type of device merely acts to unlock a hinged panel to be physically pushed open by the pet and returned by gravity or a spring mechanism. The pet door device presented here uses the transmitted ultrasound to trigger the activation of an electric motor and transport mechanism to move a panel in and out of the door opening in a somewhat similar fashion to that of a power car window thereby, facilitating added security from intruders and weather and automatic operation requiring no human effort.

SUMMARY OF THE INVENTION

This invention makes practical use of the directionality inherent in ultrasonic transmission and offers a novel means of modulating the transmitted signal to increase the working range from a conventional twenty-five feet to over three hundred feet. This is achieved by delivering the ultrasonic signal output in periodic bursts. The receiver is designed to detect these bursts by sensing a repeated low to high transition at the amplifier input at predetermined intervals corresponding to the periodic rate of generation of ultrasonic bursts at the transmitter. Thus, sporadic environmental noise in the frequency range of the transceiver is essentially filtered out allowing the amplifier in the receiver to trigger on extremely low level signals.

Applied to the development of a wireless pet containment system, the present invention requires no antenna nor buried cable and specifically optimizes and makes use of the inherent directionality of ultrasound to approximate a linear beam of ultrasound forming a wireless boundary. The signal modulation and edge detect receiver virtually eliminate the possibility of false triggering which would allow the device to needlessly shock the animal. Additionally, it is possible to simultaneously send two individually modulated ultrasonic signals, one of higher amplification for a wider transmitted beam and one of lower amplification for a narrower transmitted beam, to separately control the warning tone and shock outputs at the receiver, making it impossible for a clever animal to run through the perimeter and out of range during the time delay from warning tone to shock used by conventional devices.

The invention in its present form also provides a useful alternative to the use of R.F. transmission in the creation of a remote training device by greatly extending the range of conventional ultrasonic transceivers. The result is a remote training device with a useful range comparable to that of a conventional R.F. transceiver but, without the possibility of interfering with the reception of radio, television and other R.F. signals. The training device then uses one or more preset ultrasonic pulse rates to trigger one or more tones for use in obedience training of pets.

The directional characteristics of ultrasound are of great value applied to the operation of an automatic pet door by allowing an acceptable frontal activation range when the pet is facing and approaching receiver but, greatly reducing the probability of false triggering of the receiver when the pet is just passing by at even closer range than the frontal activation distance. The modulated pulsed signal and edge detect receiver technique are employed to create an ultrasonic key code so that the device may be operated only by the pet wearing a transmitter with those specific modulation characteristics to be sensed by the receiver. This type of pet door achieves the advantages of preventing stray animals and intruders from entering the home through the pet door (a common problem with conventional mechanical pet doors) and provides protection against strong wind which can easily blow through the hinged flap of a conventional pet door.

BRIEF DESCRIPTION OF THE DRAWINGS

FIG. 7(a) is a block diagram of the ultrasonic transmitter.

FIG. 7(b) is a block diagram of the ultrasonic receiver.

DETAILED DESCRIPTION

Figure 15:
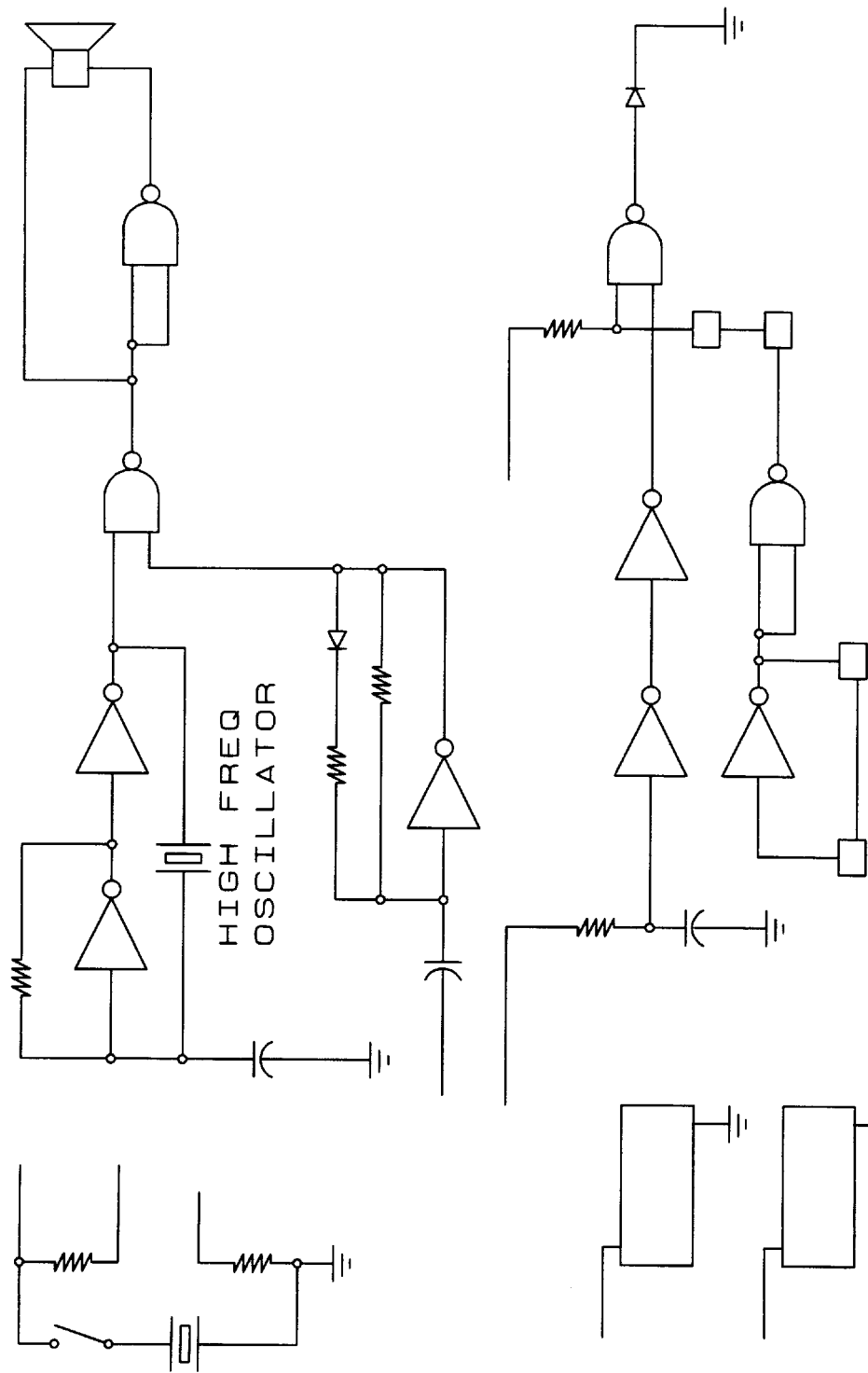
FIG. 15 is a circuit diagram of the ultrasonic transmitter with modulator.

The present invention is an ultrasonic transceiver designed specifically to control various output devices for use by domestic animals. The output devices, which are also the subject of this invention, include a wireless pet containment system; a sonic alarm for area restriction; a remote pet trainer and a remotely operated, fully automatic pet door. The basic ultrasonic transceiver, shown in block form in FIGS. 7(a) and (b), utilizes a conventional quartz crystal controlled oscillator 1 to generate the carrier frequency. Ultrasonic frequencies of 32.7 KHZ and 40 KHZ are convenient because microphones, piezo speakers and quartz crystals of these values are readily available. The oscillated signal is fed to a modulator 2. FIG. 15 is an electrical schematic of the oscillator and modulator which together employ a "hex schmitt trigger" and "quad dual input schmitt NAND" integrated circuit to create a pulsed output consisting of periodic bursts of high frequency ultrasound of the type shown in FIG. 9(a). Various other modulation techniques may be employed to develop individual coded signals each to activate a separate functional output. These may include frequency modulation, amplitude modulation, pulse rate modulation, the generation of a pulse code or other techniques. The means employed in the embodiment of FIG. 15 simply varies the time interval between output bursts. The output amplitude is equal to the maximum plus and minus voltage supplied to the device which is typically limited to the maximum voltage rating of the integrated circuits of three to six volts direct current. The pulsed signal may be fed to an operational amplifier 3 to increase the working voltage supplied to the output speaker 4. The preferred embodiment employs a narrow band piezo transducer for the speaker due to its high efficiency. The electric current demand of such a device may be easily optimized to less than fifty microamperes facilitating the use of a small light-weight power source 5, such as a lithium coin cell battery, which can easily be worn by a pet with an acceptable useful life at the 50 microampere current consumption of six months to one year.

Figure 10:
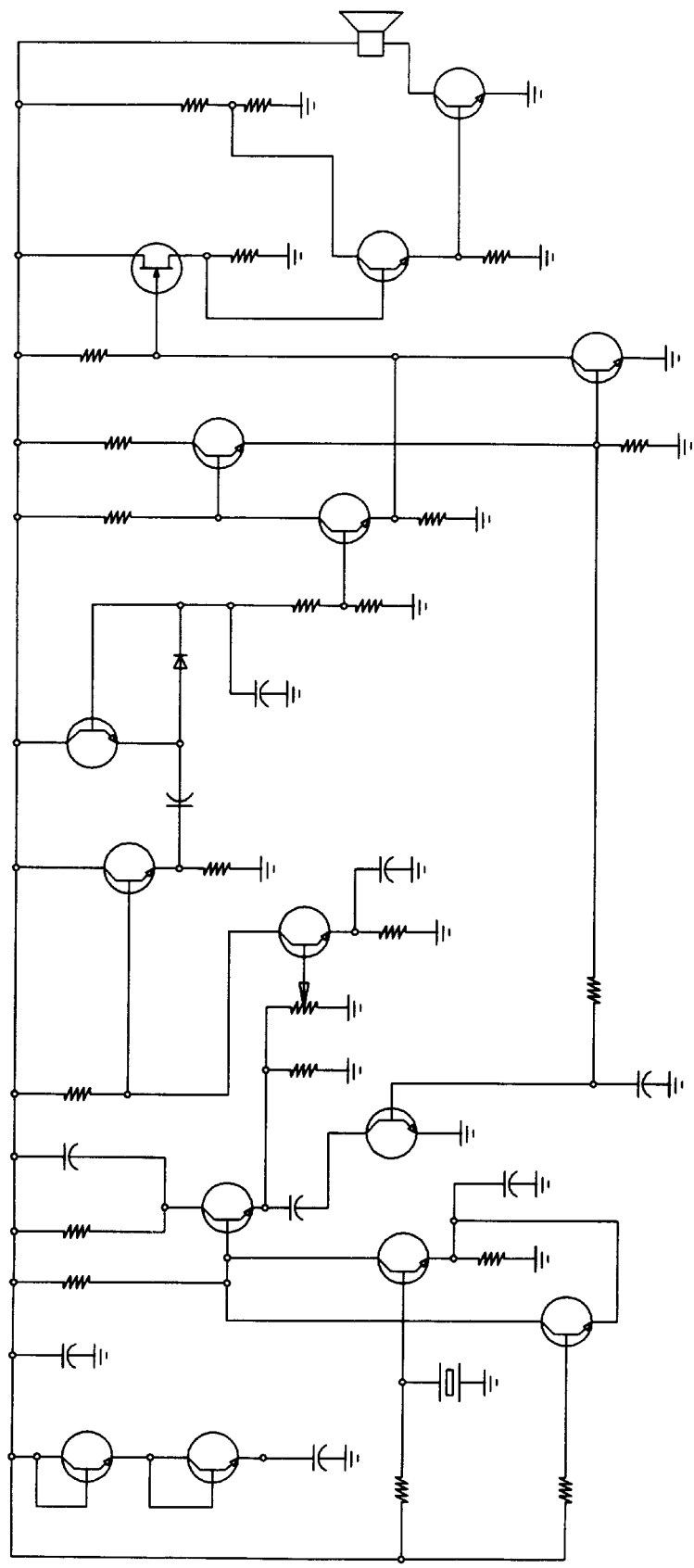
FIG. 10 is a circuit diagram of the operational amplifier employed as part of the ultrasonic receiver.

The receiver utilizes a narrow band piezo electric microphone 6 fed to a multi-stage operational amplifier 7 of the variety shown in FIG. 10. The use of discrete components, instead of commercial grade integrated circuits in this embodiment, allows quiescent electric current consumption of the receiver to be also limited to under 50 microamperes providing acceptable battery life from a light-weight lithium source 11.

Figure 9A:
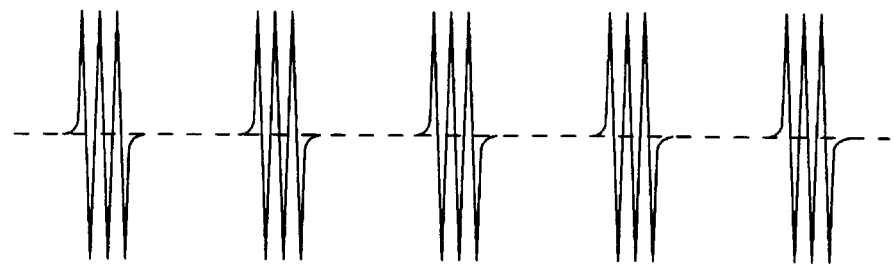
FIG. 9(a) illustrates the burst modulated ultrasonic wave form typically emitted by the ultrasonic transmitter showing the high to low transitions sensed by the receiver in the absence of environmental background noise.
Figure 9B:
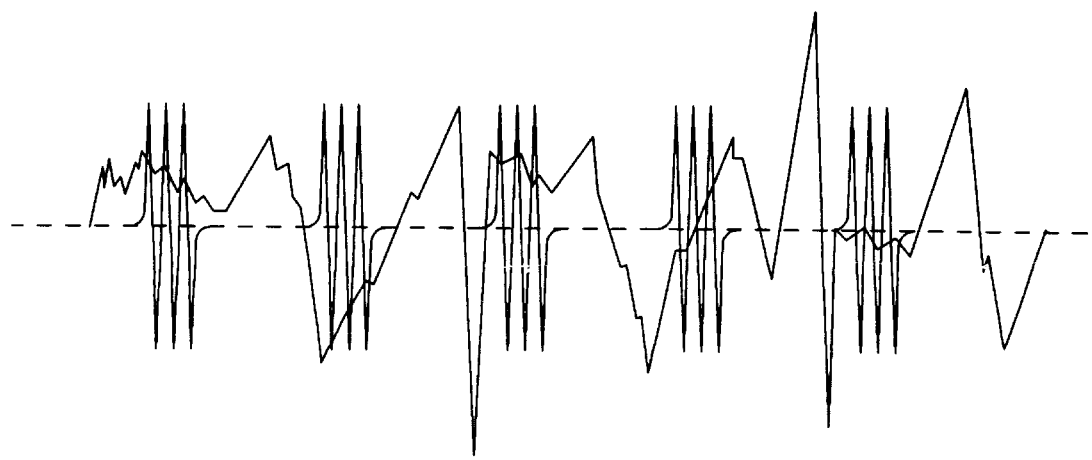
FIG. 9(b) illustrates the burst modulated ultrasonic wave form typically emitted by the ultrasonic transmitter showing the high to low transitions sensed by the receiver in the presence of background noise of the same carrier frequency as the transmitter with typical sporadic peaks which are of greater amplitude than the transmitted ultrasonic signal.

The demodulation technique employs an edge detector which senses the low to high transition of the initial burst received at the amplifier. FIG. 9(a) shows that in the absence of background noise, the transition is measured from the zero state to the peak amplitude of the initial burst. As shown in FIG. 9(b) background noise shifts the zero baseline at each edge to the background level. The low to high transition is then sensed as the difference between the background level and the peak amplitude of the pulse. Once the first edge is detected, a timer is started with its duration equal to the interval between bursts of the transmitted signal. While the timer is running, the sensor is disabled so changes in background are not mistaken for another edge. At the end of the timing period the sensor resumes within a narrow time window. If a second edge is sensed within this time window it is taken as receipt of the modulated signal the output device 9 is activated. The technique may be repeated for multiple edge detect cycles before the output is activated, for added insurance against the probability of detecting a transition in the background noise which happens to occur within the edge detect time window. This technique greatly increases the working range of the device since it requires only a very small transition in ultrasound amplitude to trigger the device. The magnitude of that transition may be much less than the background ultrasound level. The fact that environmental background noise is generally sporadic with large momentary peaks, represents a problem to conventional devices which trigger on fixed signal levels and are apt to confuse a large background peak with the actual transmitted signal. In this device, background noise may be much larger than the minimum edge amplitude and indeed higher, at its peak, than that of the transmitted signal itself without affecting the sensitivity or range of the device. Even in worst case conditions where some unusual source of background noise level is high and of long, steady duration, it may only serve to mask some of the transmitted signal ultimately reducing range yet, it is still impossible for the device to trigger falsely on the background noise.

Figure 14:
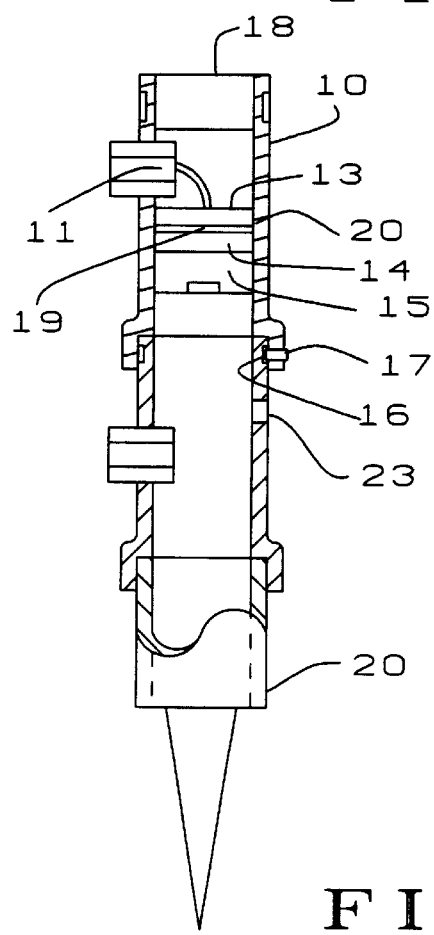
FIG. 14 is a cross-section of the transmitter casings and positioning post used in the pet containment system.

FIG. 14 shows the working elements of the receiver enclosed within tubular upper casing 10. Speaker 4 is mounted inside tubular ultrasound shaping element 12 which is projected through a hole in the casing. The purpose of ultrasound shaping element 12 is to narrow the projected ultrasound envelope to more closely resemble a beam of ultrasound. Mounted within the casing is printed circuit board 13 with protruding contact spring 19 and leaf contact 20 contacting, respectively, the negative and positive terminals of lithium coin cell battery 14. Battery retainer 15 is threaded into the casing to hold the battery in place and seal off one end of the casing. Cover 18 is pressed into the opposite end of the casing to seal that end. Lower casing 23, identical to casing 10 and housing identical elements, is fitted into counter-bore 40 in the upper casing and allowed to rotate relative to that casing for proper positioning until secured in a fixed position by set screw 17 passing through a threaded hole in the counter-bored wall and into groove 16 thus, locking upper and lower casings rigidly together. Post 20 is fitted into counter-bore 41 of the lower casing. Set screw 42 of the lower casing passes through a threaded hole in the casing's counter-bored wall and into groove 22 in the post locking lower casing and post rigidly together.

Figure 12:
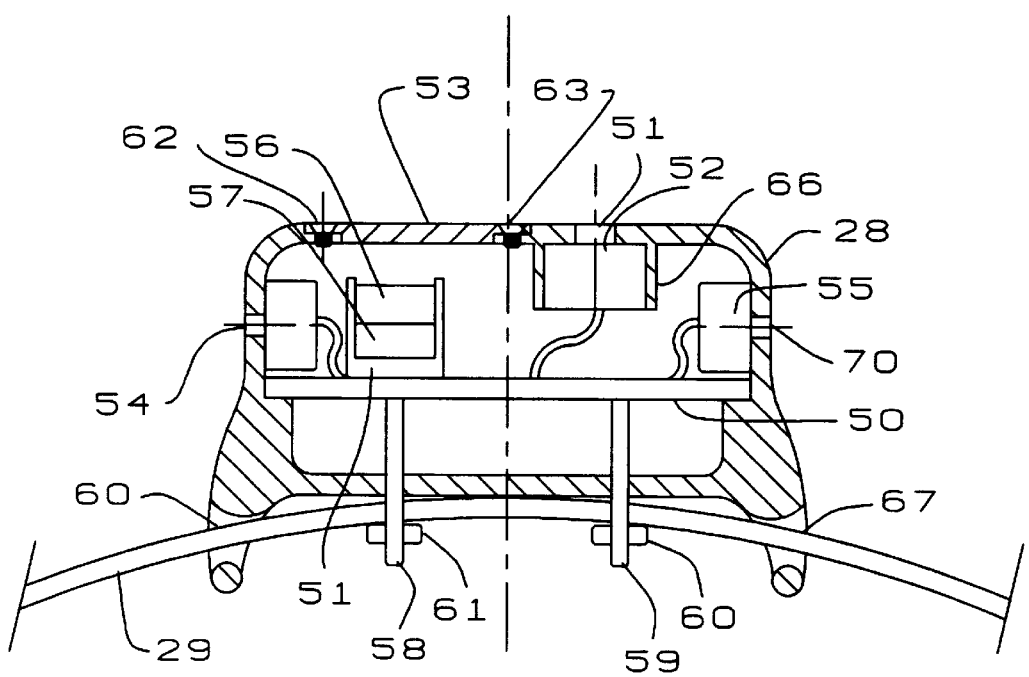
FIG. 12 is a cross-section of the receiver assembly.

FIG. 12 shows the receiver assembly in which housing 28 encases microphones 54 and 55 spaced 180 degrees apart to provide a direct line of sight to posts to the left and right of the animal as it approaches the boundary. Holes 69 and 70 provide sound paths to microphones 54 and 55. Acoustical speaker 52, pressed into integrally molded retaining cylinder 66, generates the warning tone emitted through hole 52. Battery holder 51 secures and contacts lithium coin cells 56 and 57 with access to the batteries provided by battery cover 53 secured to housing 28 with screws 62 and 63. Microphones 54 and 55, battery holder 51 and speaker 52 are wired to printed circuit board 50 providing the sensing, amplifying and output circuitry. Threaded electrodes 58 and 59 are soldered directly to printed circuit board 50 and protrude through holes in housing 28 and holes in strap 29 and secured to the housing with nuts 58 and 59. This also secures strap 29 relative to housing 28 as it passes through integrally molded bezel slots 67 and 68.

Figure 1:
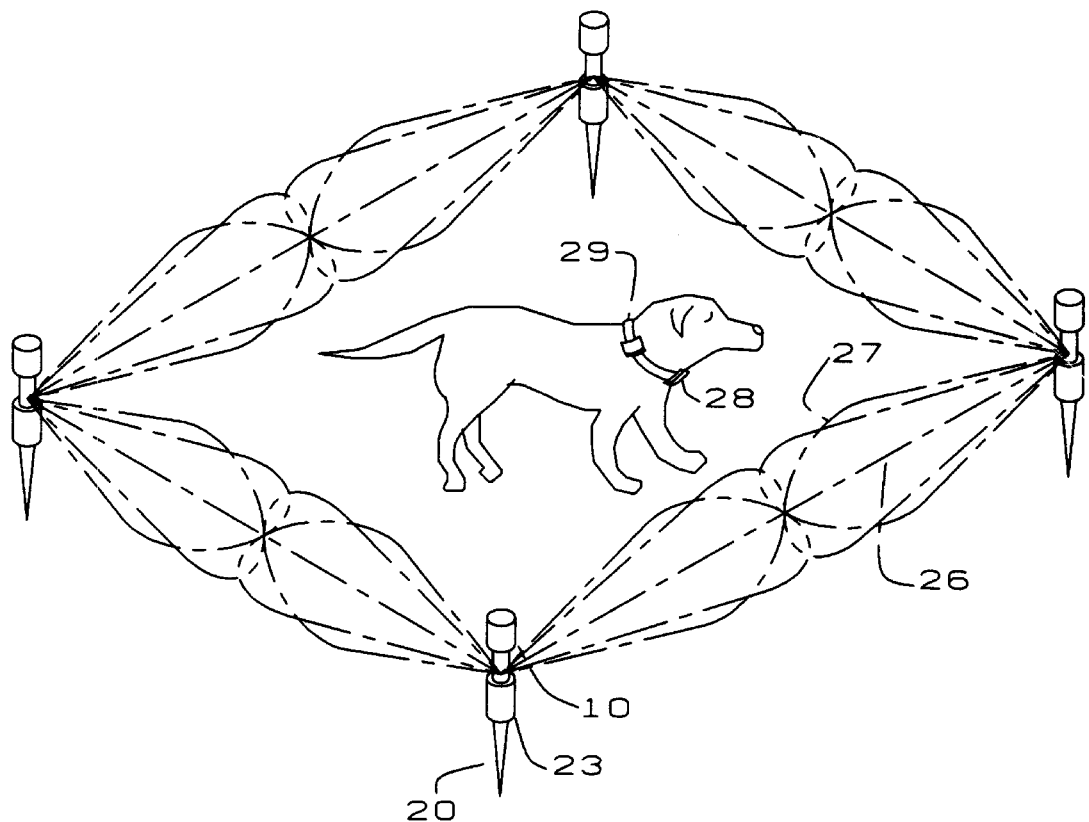
FIG. 1 schematically illustrates the ultrasonic pet containment system.

FIG. 1 schematically illustrates the interlaced ultrasound envelopes 26 created to form a perimeter when the receiver post 20 and like posts are placed in the ground with upper and lower receiver casings, 10 and 23 respectively, positioned to form the corners of the perimeter. The actual boundary line 27 is defined be the intersection of the inside leading edges of the ultrasound envelopes. Receiver casing 28 is attached to a domestic animal by strap 29 with buckle 30 looping through the receiver casing and around the animal's neck.

Figure 8:
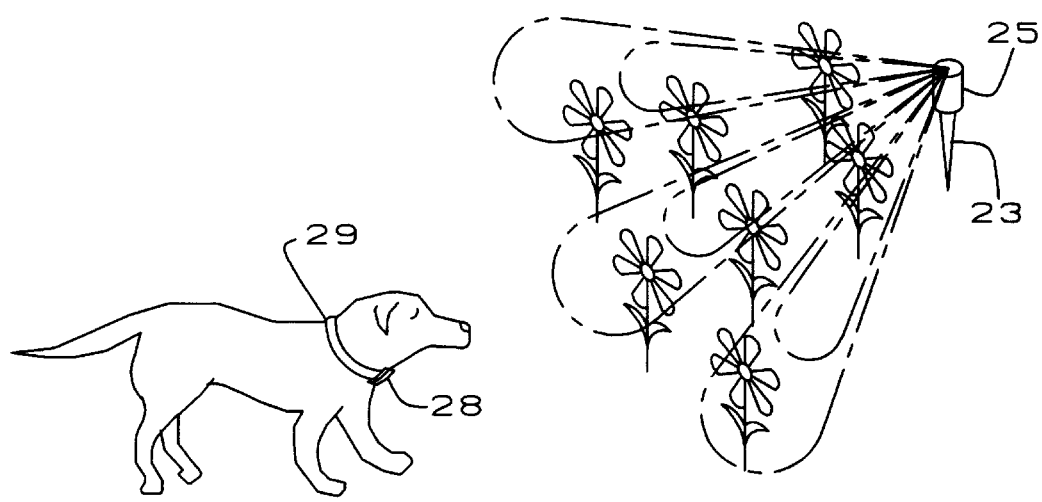
FIG. 8 schematically illustrates an alternative embodiment of the pet containment system.

FIG. 8 schematically illustrates an alternate embodiment of the pet containment system whereby, a single transmitter inside casing 23 is mounted on post 20. The transmitter casing is positioned so that the transmitted ultrasound envelopes a specific area off limits to the pet. Receiver casing 28 and mounting arrangement to the animal is identical to that shown in FIG. 1.

Figure 11:
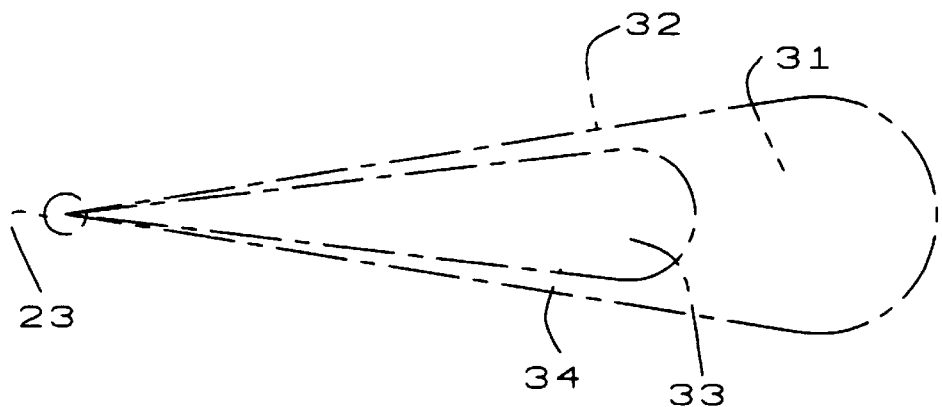
FIG. 11 is an alternate embodiment of the pet containment system using two separate signals to individually control warning tone and shock outputs.

FIG. 11 schematically illustrates the use of dual signal levels and modulations to define two separate boundary perimeters. Outside boundary area 31 is the area covered by the stronger signal. The modulation of this signal causes the receiver to generate a warning tone. That tone is delivered to the animal wearing the receiver when it crosses within outer perimeter 32. Inside boundary area 33 is the area covered by the weaker signal. The modulation of this signal causes the receiver to generate an electric shock. The shock is delivered to the animal wearing the receiver when it crosses within inter perimeter 34. This dual boundary technique is more effective in training the animal than the time delay method because the shock boundary is more clearly defined for the animal. Efforts on the part of the animal to run through the boundary before the shock is delivered are fruitless and the resultant containment system is more positive.

In the field of pet training, it has been shown by noted animal behaviorists that cats dogs and other animals respond positively to tones as training stimuli. The results of testing the training device described herein indicate that both dogs and cats can distinguish individual tones if separated by at least 1000 hertz. Each tone may then be used to positively enforce a specific behavior or command e.g. sit, stay, heal, come, fetch, etc. Negative stimuli, such as a loud piercing, tone or an electric shock may be used conjunctively to deter bad behavior and enforce the "NO!" command.

Figure 3:
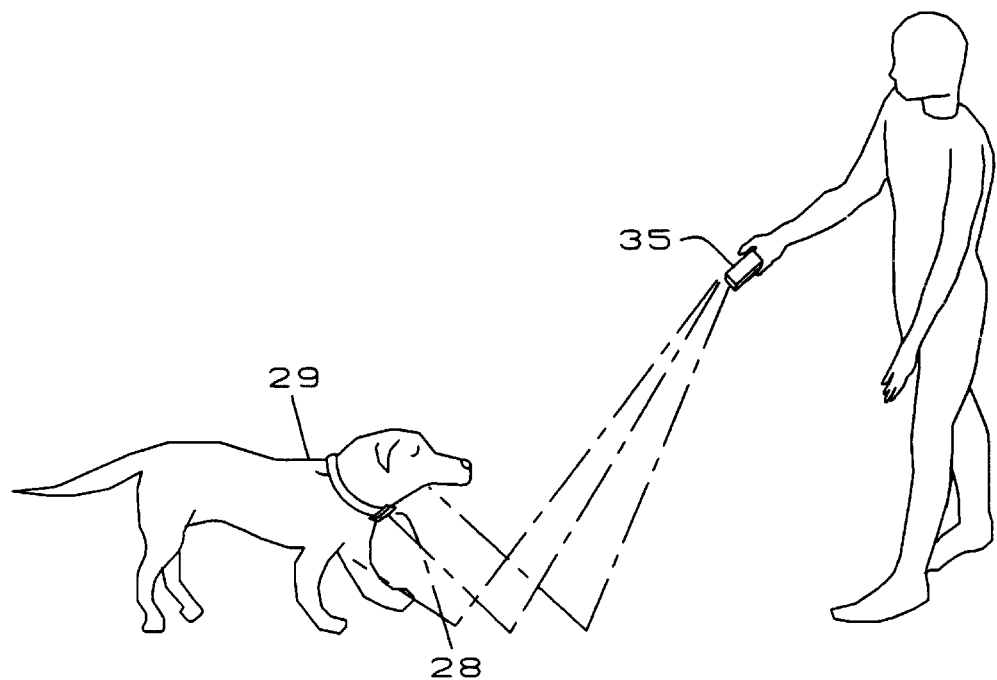
FIG. 3 schematically illustrates the remote pet trainer.
Figure 13:
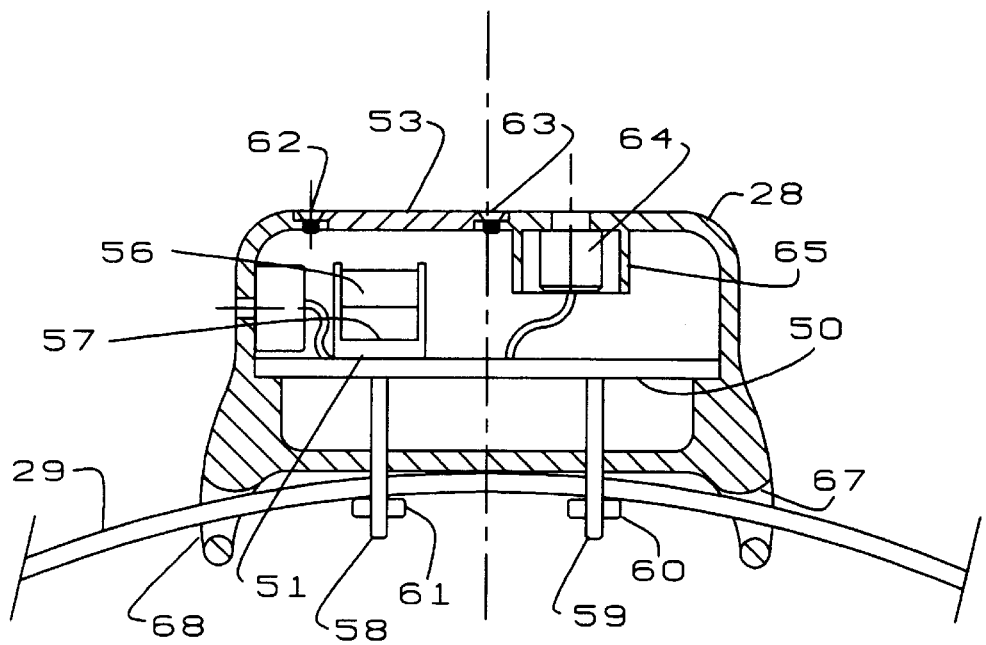
FIG. 13 is an alternate embodiment of the receiver assembly.

The training device of FIG. 3 utilizes the transceiver of FIGS. 7(a) and (b) with outputs at the receiver capable of producing multiple tones with pitch separation of at least 1000 hertz, and an electric shock corresponding to preset modulated signals produced at the transmitter. The receiver is housed within casing 28 and strapped to the animal as in FIGS. 1 and 8. The receiver assembly of FIG. 13 is similar that of FIG. 12 in all respects except that it utilizes a single microphone 65 oriented to face the ground when housing 28 is attached to the animal so that it may more easily sense the part of the transmitter signal which is reflected off the ground. This allows the device to be used effectively even when the animal is not facing the trainer so long as the line of sight between transmitter and animal is not obstructed.

Figure 2:
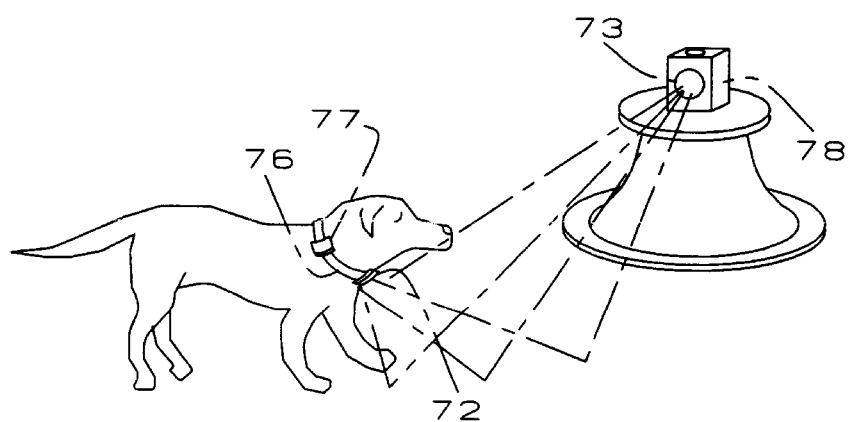
FIG. 2 schematically illustrates the sonic alarm used for area restriction.

The preferred embodiment of the sonic alarm system is shown in FIG. 2. In this embodiment, transmitter and receiver positions used in the pet containment system are switched so that the receiver of FIG. 7(b), which now activates a sonic alarm output device and visual flashing light each mounted within casing 73 with microphone 74, alarm speaker 75 and flashing light element 78, is stationary. The transmitter of FIG. 7(a) is mounted within housing 72 and attached to a domestic animal by strap 76 with buckle 77 looping through the receiver casing and around the animal's neck. In this arrangement, transmitter housing 72 may be made quite small since there is no need for a tone generating speaker or shocking device providing a more comfortable and light weight device to be worn by the animal. Receiver casing 73 may now be easily positioned at any desired location such as couch, chair, kitchen table, etc.

The variable gain control of amplifier 7, FIG. 7(b) now acts to determine the working range of the system.

Figure 4:
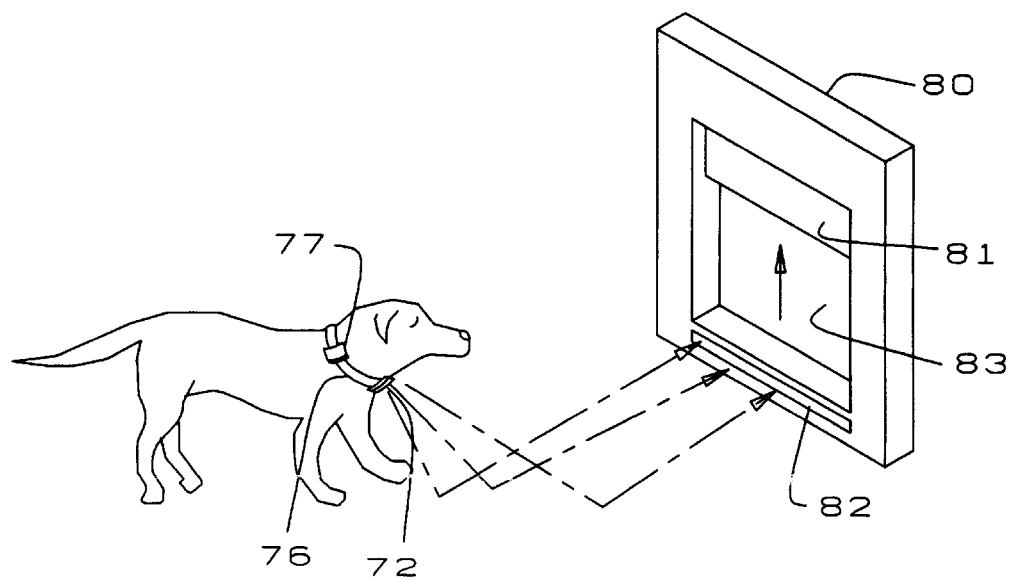
FIG. 4 schematically illustrates the automatic pet door.

FIG. 4 is a schematic representation of the automatic pet door controlled by the transceiver of FIGS. 7(a) and (b) utilizing a transmitter arrangement identical to that of FIG. 2 wherein the transmitter of FIG. 7(a) is mounted within housing 72 and attached to a domestic animal by strap 76 with buckle 77 looping through the receiver casing and around the animal's neck. FIG. 16 shows the a typical working circuit of one embodiment of the automatic pet door. Here there is no need to use discrete transistors in the receiver to conserve power since the device is ultimately powered by household alternating current.

Figure 5:
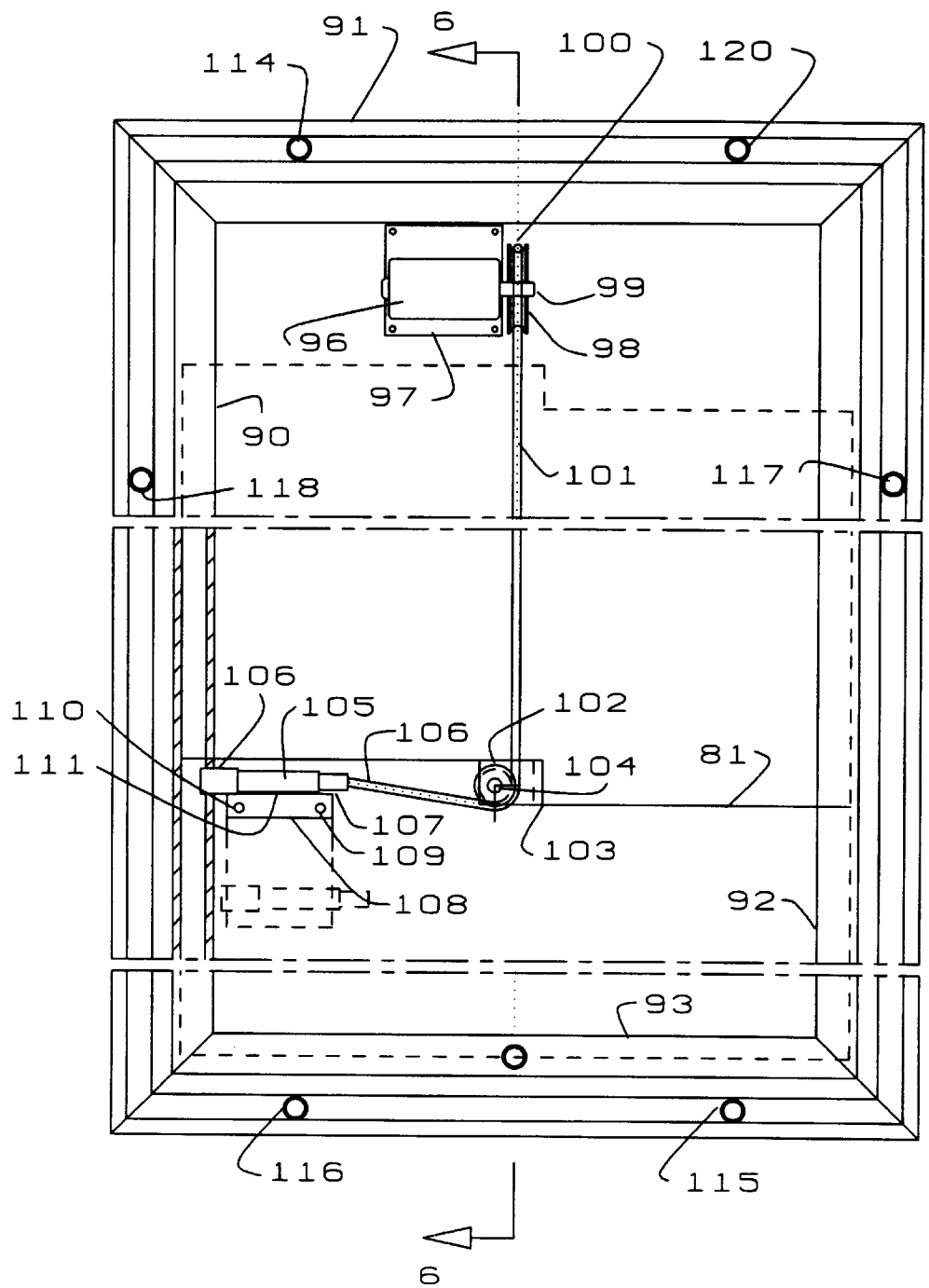
FIG. 5 is a cross-section of the automatic pet door taken along lines 1—1
Figure 6:
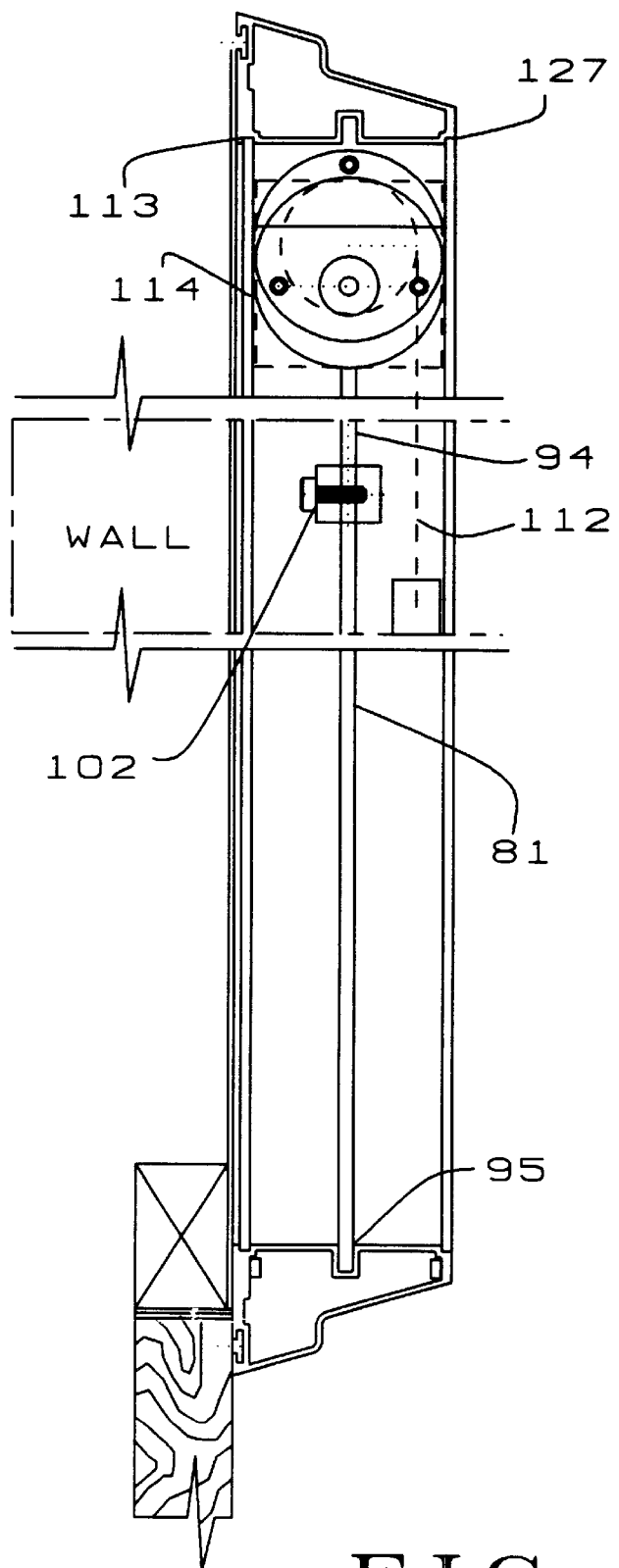
FIG. 6 is a vertical cross section of the automatic pet door taken along lines 2—2.

FIG. 5 shows that door casing 80 houses all of the elements of the receiver and door assembly. In this embodiment, an output device of FIG. 7(a) is a normally open relay 124, FIG. 16B, which routes power to motor 96, FIG. 5, when the transmitter signal is received by microphone 82. Movable panel 81, which is normally within opening 83 and completely obstructing it, is then guided upwards to allow the animal to pass through opening 83. FIG. 5 shows that door casing 80 of FIG. 4 is constructed by joining left frame member 90, right frame member 92, top frame member 91 and bottom frame member 93. Said frame members, in this embodiment, are custom wood mouldings but, could easily be made from extruded aluminium or plastic. Grooves 94 and 95 shown in FIG. 6, in left and right frame members 90 and 92 respectively, act to guide movable panel 81 along its path. Electric motor 96 is held in position by mounting bracket 97 and drives spool 98, which is rigidly fixed to motor shaft 99 with set screw 100. Cable 101 is thereby wound around spool 98 upon the counter-clockwise motion of electric motor 96. Cable 101 is looped around pulley 102 and prevented from slipping off pulley 102 by cable guide 103. Pulley 102 and cable guide 103 are rigidly attached to movable panel 81 with shoulder screw 104. Cable 101 is then fed to one end of locking pin 105, looped through a hole in that end and held in place by cable crimp 106. Locking pin 105 is held in place by bracket 108 and allowed to translate linearly in holes 106 and 107. Bracket 108 is rigidly fixed to movable panel 81 by screws 109 and 110. Compression spring 111 fitted around stepped shaft of locking pin 107 act to push locking pin 107 toward left frame member 90 and into hole 101 thus, preventing the movable panel from being moved out of opening 83 while there is slack in cable 101 as when motor 96 is idle. Thus, it is not possible for an intruder to manually lift movable panel 81. As cable 101 is wound around spool 98 when motor shaft 99 is rotated, the weight of movable panel 81 acts to create tension in cable 101. Said tension acts against compression spring 111 pulling locking pin 107 away from left frame member 90 and out of hole 101 freeing movable panel 81 and allowing it to move upward with cable 101. Front and rear plates 112 and 113, FIG. 6, respectively are locked into grooves 127 and 114 respectively and act to enclose the assembly. Holes 115, 116, 117, 118, 119 and 120, FIG. 5, are provided to mount the assembly to a household door or wall.

In this embodiment activation of electric motor 96 ultimately acts lift movable panel 81. When power is removed from electric motor 96, as in the absence of a signal sensed by the ultrasonic receiver of FIG. 7(b), movable panel 81 will return to its initial position under the force of gravity. A shown in FIG. 16B, the speed of return may be controlled by the addition of resistor 121 and diode 122 across the legs of electric motor 96 to create an electro magnetic field in the internal coil of electric motor 96 which is resistive to the motion of motor shaft 99 in the direction of unwind thus, slowing the downward motion of the panel.

Figure 16B:
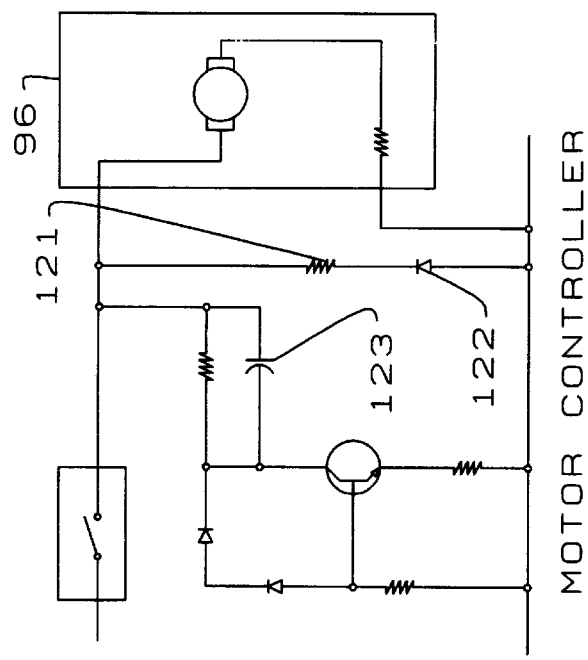
FIG. 16B is a diagram of the automatic pet door control circuit motor controller.
Figure 16A:
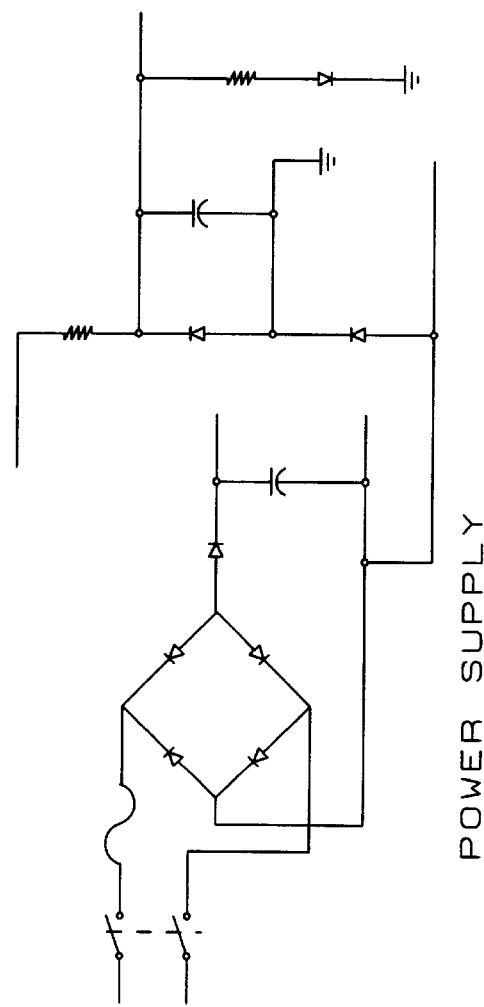
FIG. 16A is a diagram of the automatic pet door control circuit power supply.
Figure 16C:
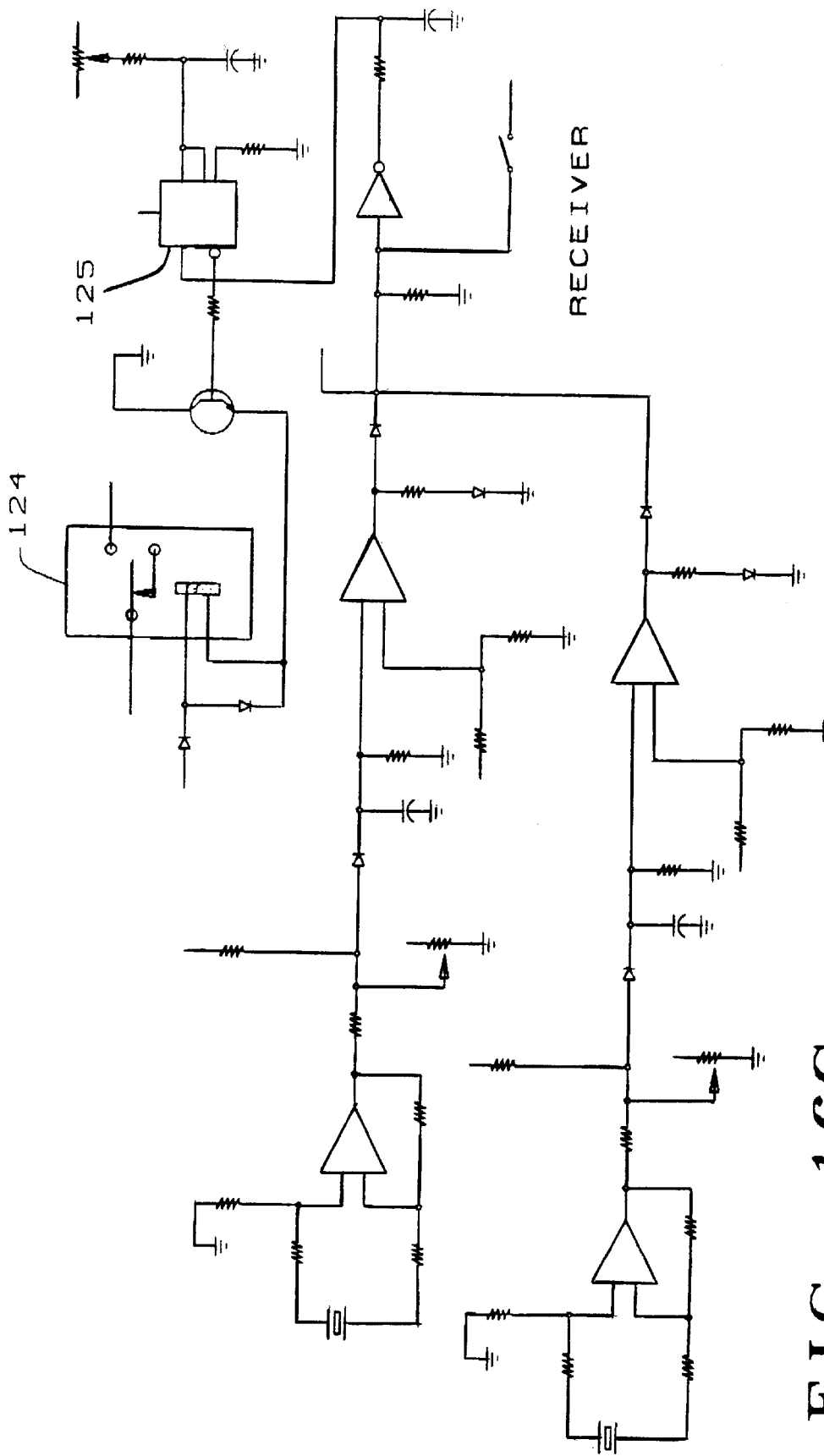
FIG. 16C B is a diagram of the automatic pet door control circuit operational amplifier.

FIG. 16B further shows that the coil to relay 124 is energized upon sensing the ultrasonic signal. Timer 125 holds relay 124 on, providing power to motor 96, for a selected amount of time after the signal is lost. Electrical energy is stored in capacitor 123 on the counter-clockwise motion of motor 96 as movable panel 81 is hoisted upward. This same energy is released upon the deactivation of relay 124 providing a momentary surge of current to move motor 96 in the clockwise reverse direction in order to overcome any static friction in the system and start movable panel 81 on its downward path under the force of gravity.

What is claimed is:

1. A directional, ultrasonic transceiver for pets comprising:
   an ultrasonic transmitter means for creating an ultrasonic signal within an elongated ultrasonic field envelope, said transmitter means possessing sound shaping means for further augmenting said ultrasonic field envelope to a more beam-like profile;
   an ultrasonic receiver means for wearing by a pet for the detection of said ultrasonic signal within said elongated ultrasonic field envelope, said receiver means possessing means for delivering a sensory stimulus to said animal upon reception of said ultrasonic signal.

2. A directional ultrasonic pet detection system comprising:
   a transmitter means for wearing by a pet, said transmitter means having a directional ultrasonic output, said ultrasonic output emitted in a direction downward toward the ground directly in front of said pet and bounced forwardly in the direction in which said pet is facing;
   directional receiver means for detecting said forwardly bounced ultrasonic output, only when said pet is facing said receiver means;
   means for converting said detected ultrasonic output to an electric voltage output for the activation of remote controlled apparatus for pets.

3. A directional, ultrasonic transceiver for pets comprising:
   an ultrasonic transmitter means, for creating an ultrasonic signal within an ultrasonic field envelope, said ultrasonic transmitter means possessing modulation means for the creation of one or more modulation codes in said ultrasonic signal, said modulation codes being selectively transmitted;
   an ultrasonic receiver means for detection of said ultrasonic signal within said ultrasonic field envelope, said ultrasonic receiver means possessing demodulation means to differentiate between said modulation codes and means for converting the said ultrasonic signal to one or more electric voltage outputs, the output selected depending upon the particular modulation code received, for the activation of various remote controlled apparatus for pets.

4. A directional, ultrasonic transceiver for pets comprising:
   an ultrasonic transmitter means, for creating an ultrasonic signal within an ultrasonic field envelope, the output of said ultrasonic transmitter means comprising a series of ultrasound bursts having a predetermined pulse duration, said bursts being emitted at a predetermined rate of bursts per unit time,
   an ultrasonic receiver means for detection of said ultrasonic signal within said ultrasonic field envelope; said ultrasonic receiver means employing a method of rejecting environmental noise and surface reflections of the bursts by sensing the low to high transition of a first received burst then rejecting any low to high transition of a next received burst which does not occur within a predetermined, narrow window of time and further rejecting said low to high transition of said next received burst if it is not approximately equal in peak amplitude to said low to high transition of said first received burst, said receiver means further measuring the time duration between said first and next received bursts and activating an electric voltage output means, for the operation of remote controlled apparatus for pets, only when a predetermined number of bursts have been received and accepted at said predetermined rate of bursts per unit time.

5. A directional ultrasonic detection system to chase pets out of restricted areas comprising:

transmitter means for wearing around the neck of a domestic animal, said transmitter means having a directional ultrasonic output, said output downwardly pointed toward the ground directly in front of said domestic animal and bounced forwardly in the direction in which said animal is facing;

directional receiver means for detecting said ultrasonic output only when said animal forwardly approaches said receiver means on a proximate line of sight path;

means for creating a sensory stimulus at said receiver means for training said domestic animal to retreat from said receiver means upon said detection.

6. The invention of claim 5 wherein said sensory stimulus is a visible light ray.

7. The invention of claim 5 wherein said sensory stimulus is a sonic alarm.

8. A self opening and closing pet door to automatically open in the presence of an ultrasonic signal and automatically close in the absence of said signal comprising;

a transmitter means for wearing by a pet, said transmitter means having a directional ultrasonic output, said ultrasonic output emitted in a direction downward toward the ground directly in front of said pet and bounced forwardly in the direction in which said pet is facing directional receiver means for detecting said forwardly bounced ultrasonic output, only when said pet is facing said receiver means;

means for converting said detected ultrasonic output to an electric voltage output;

a casing with opening to allow a domestic animal to pass from one side of said casing to another, a movable panel normally placed within said opening to obstruct the path of the animal through said casing, means for moving said movable panel out of said opening in said door casing upon reception of the transmitted ultrasonic signal by said ultrasonic receiver means, means for guiding said movable panel along its path, means for attaching said casing to a wall or door of a building structure.

9. The invention of claim 8 wherein, said receiver means possesses means to effectively control the distance from the domestic animal at which said receiver means detects said ultrasonic output.

10. The invention of claim 8 wherein the means to move said movable panel comprises an electric motor, a spool attached to the shaft of said electric motor, a cable, one end of which is attached to said spool, the other of which is attached to said movable panel for the purpose of raising said movable panel as said cable winds around said spool as said spool rotates with the shaft of said electric motor.

11. The invention of claim 10 wherein, return of said movable panel to its normal position within the opening of said casing is automatically accomplished by the force of gravity once said electric motor is deactivated in the absence of reception of said ultrasonic output by said receiver means.

12. A directional, ultrasonic area restriction system for animals comprising:

an ultrasonic transmitter means and sound shaping means, for creating an ultrasonic signal within an elongated ultrasonic field envelope, said ultrasonic field envelope having an outermost boundary, said outermost boundary having its length several times greater than its width;

ultrasonic receiver means for wearing by an animal, said receiver means for detection of said ultrasonic signal when said animal, approaching from outside of said ultrasonic field envelope, crosses said outermost boundary;

means for creating a sensory stimulus to said animal upon reception of said ultrasonic signal by said receiver means, said sensory stimulus being for the purpose of training the animal to avoid crossing said outermost boundary of said ultrasonic field envelope.

13. The invention of claim 12 further comprising, means for attaching said ultrasonic transmitter means to a positioning post to be placed in the ground.

14. The invention of claim 12 wherein, the transmitter means alternately generates two separate modulated signals to define two independent boundaries, the receiver means thereby independently activating a warning tone output and a shock output depending upon which modulated signal is received.

15. The invention of claim 12 further comprising a variable gain control at said transmitter means to effectively control the size of said ultrasonic field envelope.

16. The invention of claim 12 wherein, said sensory stimulus comprises a sonic alarm.

17. The invention of claim 12 wherein said sensory stimulus comprises an electric shock.

18. The invention of claim 12 wherein said sensory stimulus comprises a warning tone followed by an electric shock.

19. The invention of claim 12 wherein, said ultrasonic field envelope approximates a beam transmitted along the perimeter of an area to restrict animals to roaming within said perimeter and further comprising a pair of said transmitter means attached to a positioning post to be placed in the ground to establish one corner of the restrictive perimeter.

20. The invention of claim 19 wherein, said pair of transmitter means are mounted within casings and allowed to rotate relative to one another to adjust the angle of said corner.

* * * * *